UNITED STATES PATENT OFFICE.

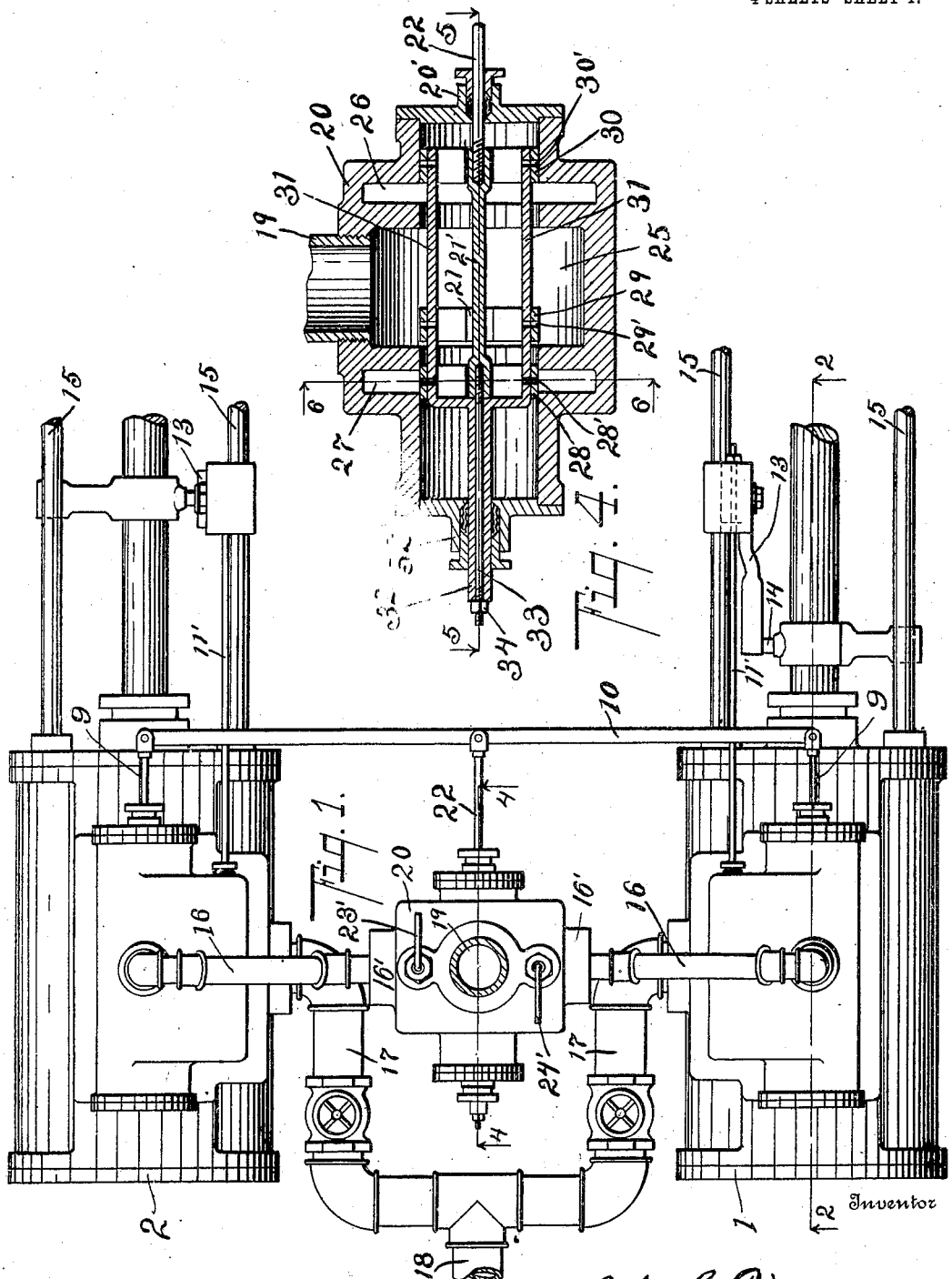

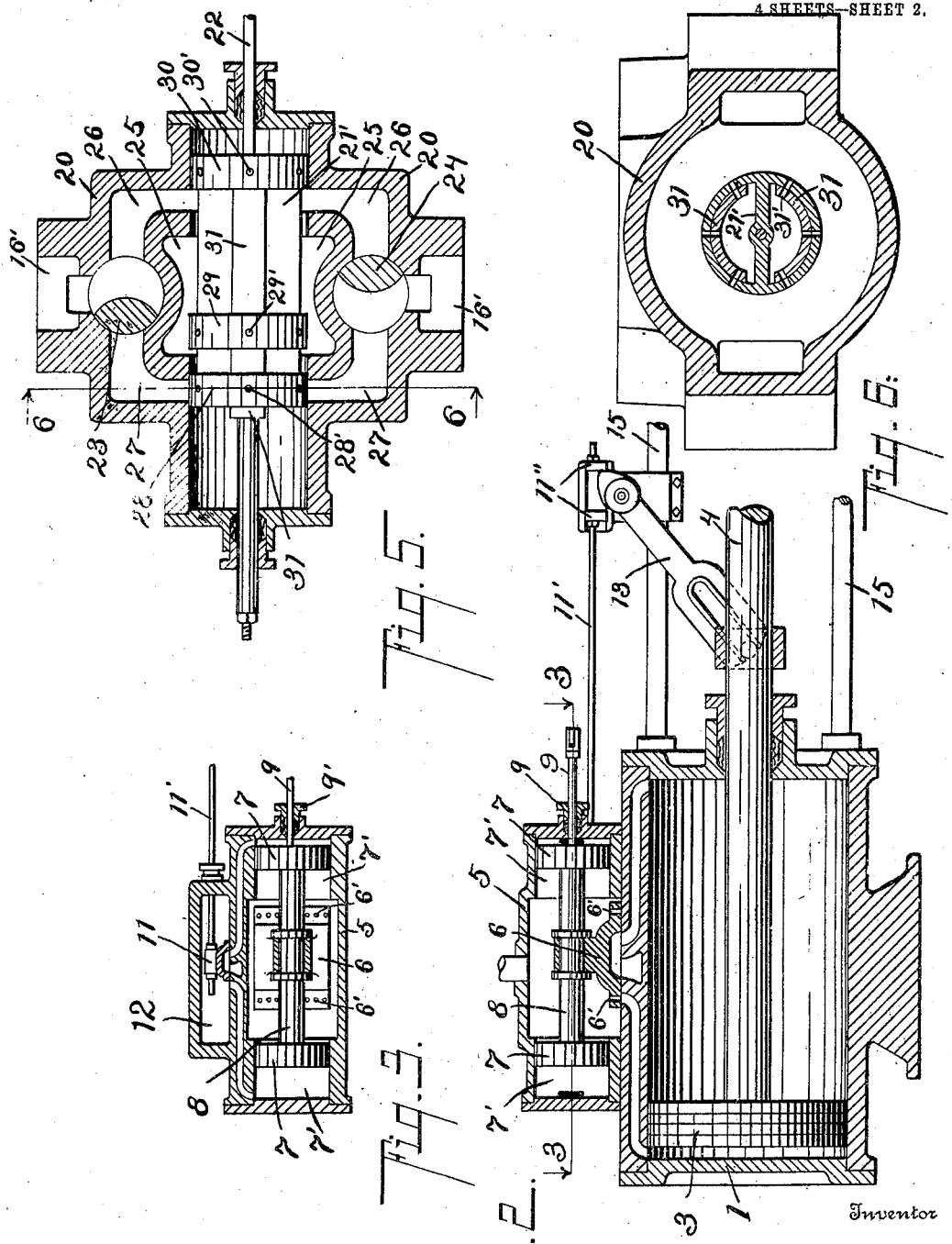

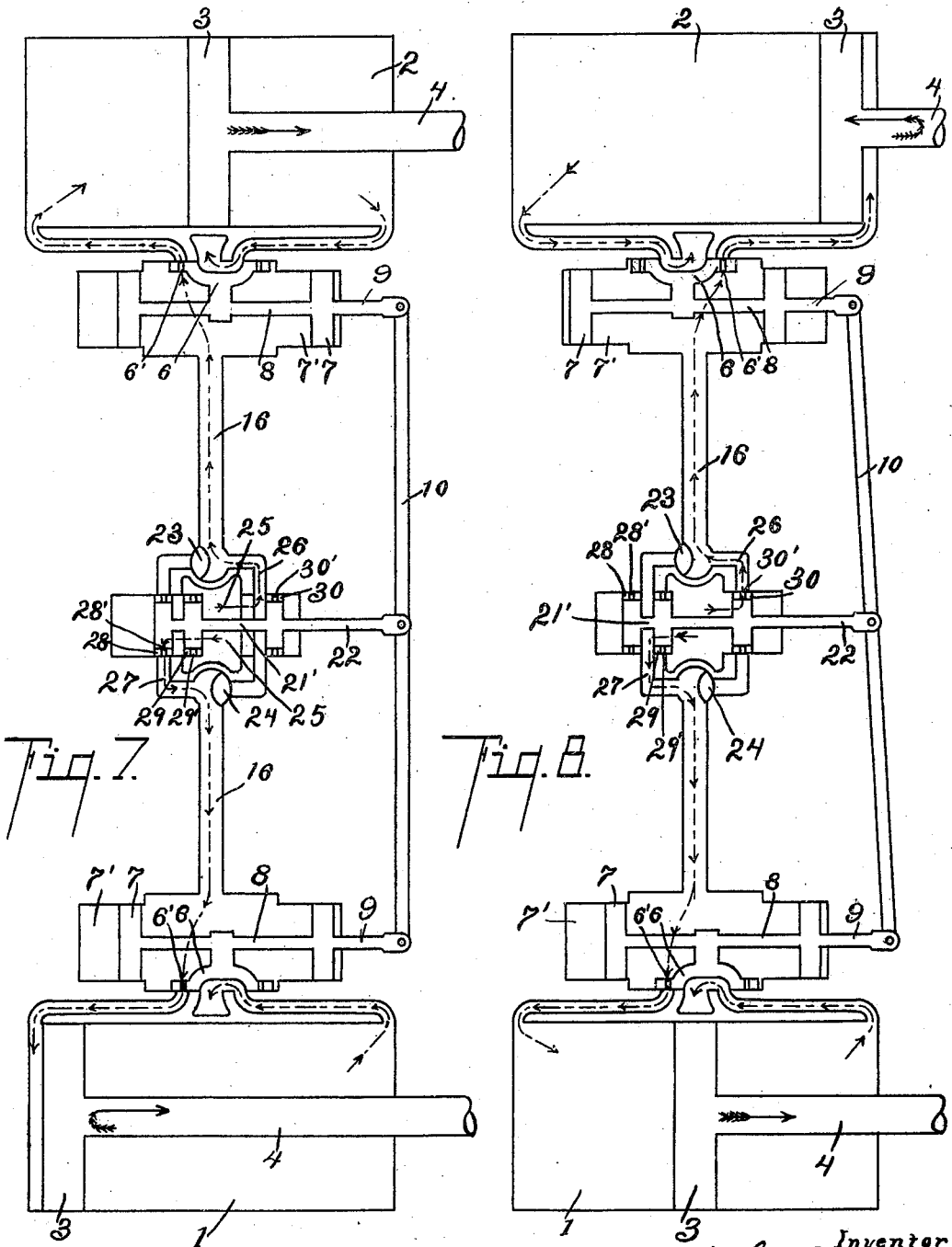

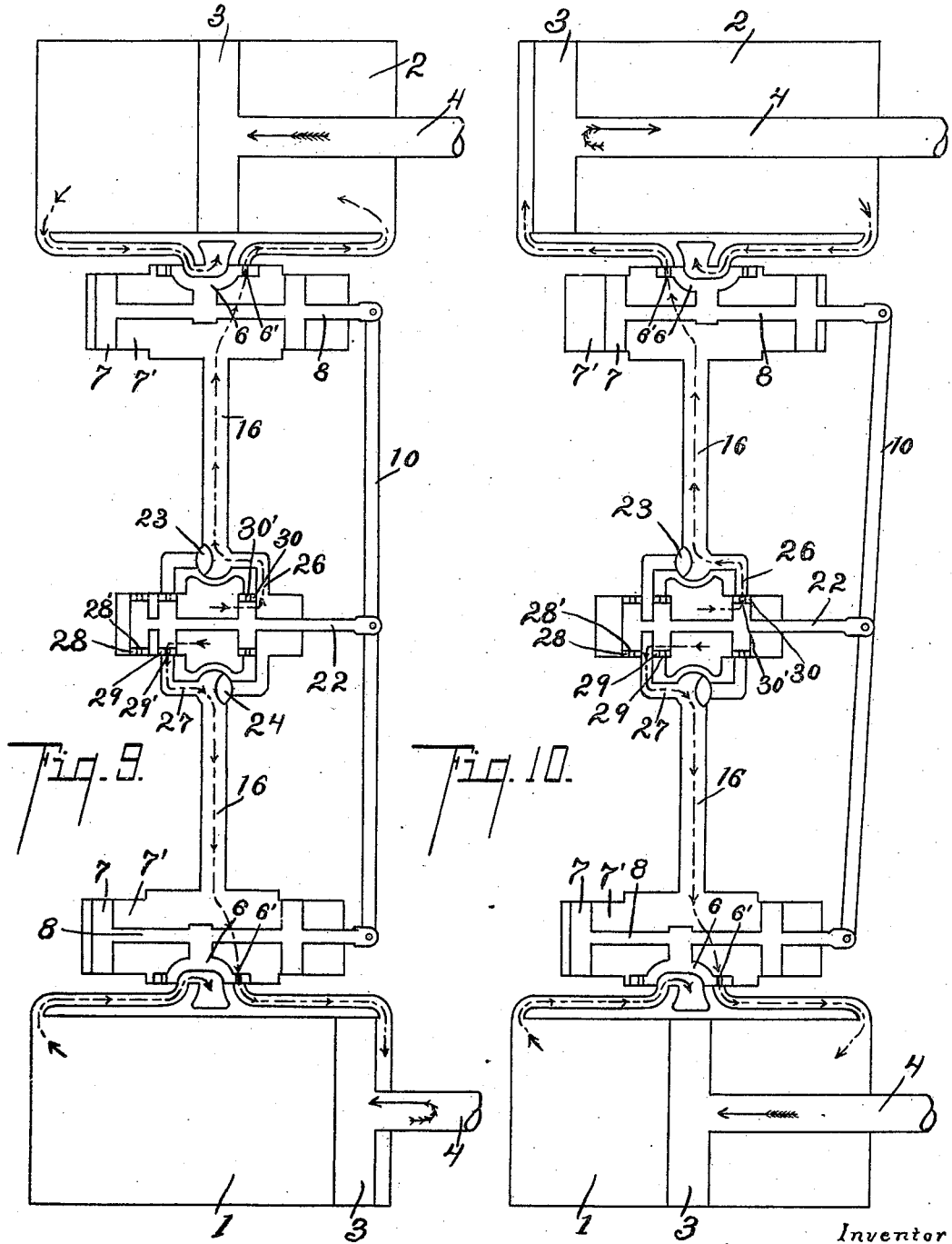

JOHN C. BIRD, OF BATTLE CREEK, MICHIGAN, ASSIGNOR TO UNION STEAM PUMP COMPANY, OF BATTLE CREEK, MICHIGAN.

VALVE MECHANISM FOR STEAM-ENGINES.

933,952.      Specification of Letters Patent.    Patented Sept. 14, 1909.

Application filed July 15, 1907. Serial No. 383,856.

*To all whom it may concern:*

Be it known that I, JOHN C. BIRD, a citizen of the United States, residing at the city of Battle Creek, county of Calhoun, State of Michigan, have invented certain new and useful Improvements in Valve Mechanism for Steam-Engines, of which the following is a specification.

This invention relates to improvements in the valve mechanism for steam engines.

The objects of the invention are: first, to control the supply of steam to a plurality of engines, whereby the engines will be controlled and brought into step in proper relation to each other, like the duplex engines of a duplex pump and, at the same time, make it possible to cut out one or the other of said engines so that it can be repaired or repacked, without stopping both or all of the engines. Second, to provide a plurality of engines which will be brought into step with each other like the engines of duplex pumps, in which the engine-valves of each cylinder are controlled by the piston of such cylinder, so that there will be no loss or waste of steam from the valve of each engine being improperly controlled and causing short-stroking.

Further objects, and objects relating to details of construction, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which:

Figure 1 is a plan view of a pair of engines coupled by my improved mechanism, the yoke-bars and piston-rod being shown broken off, as the pump or other means on which the engine acts is not necessarily a part of this invention; Fig. 2 is a detail longitudinal sectional elevation view, taken on line 2—2 of Fig. 1, through the engine 1; Fig. 3 is a detail horizontal sectional view through the engine-valve and its auxiliary valve, taken on line 3—3 of Fig. 2; Fig. 4 is an enlarged detail sectional elevation of the valve, taken on line 4—4 of Fig. 1, through the improved controlling or synchronizing valve; Fig. 5 is a horizontal sectional view of the synchronizing valve, taken on line 5—5 of Fig. 4; Fig. 6 is a transverse detail sectional elevation, taken on line 6—6 of Figs. 4 and 5; and Figs. 7, 8, 9 and 10 are diagrammatic views showing the relation of the various parts of my improved synchronizing valve, in various positions in the operation of a pair of engines thereby.

In the drawing, all of the sectional views are taken looking in the direction of the little arrows at the ends of the section lines, and similar numerals of reference refer to similar parts throughout the several views.

Referring to the numbered parts of the drawing, a pair of engines 1 at the right and 2 at the left are shown connected and controlled by my improved synchronizing-valve mechanism. A piston 3 is in each engine cylinder, and a piston rod 4 projects through a suitable stuffing-box and connects to a pump or other driven part, the engine being especially adapted for use on pumps and direct work, although of course it may be desirable to control such engines for other purposes. Each engine is provided with a steam-chest 5, which steam-chest is provided with a steam-actuated valve controlled by pistons 7—7 in short steam cylinders 7' 7' at each end. A rod or stem 8 connects the two pistons together and connects them to a D-slide valve 6 containing perforations toward each end 6' for the admission of steam. Any engine valve may be used.

A piston-rod 9 extends out through a stuffing-box 9' on the end of each steam-chest 5, so that the piston also, besides controlling the valve, acts as an engine through the rod 9 to control or act upon a lever-bar 10, this action on the lever-bar 10 being the means of controlling the synchronizing-valve.

Steam is admitted to actuate the pistons 7 by the auxiliary engine-valve 11 in the auxiliary steam-chest 12, which auxiliary valve is controlled by the valve-stem 11' which is controlled by the action of the swinging arm 13 controlled from the piston rod 4 contacting with the stops 11″ 11″, whereby the auxiliary-valve is controlled and steam is admitted to actuate the pistons 7—7 in exactly the same manner that the piston of a steam engine is controlled. This steam-actuated valve mechanism and means is identical on the two engines 1 and 2 referred to.

A steam supply pipe 16 leads from the synchronizing-valve casing 20 to each engine and the exhaust from the engine is through pipes 17 and 17 connected to pipe 18, as clearly appears in Fig. 1.

Midway between the two engines 1 and 2 is my improved synchronizing-valve consisting of a casing 20 which receives steam through the pipe 19 and delivers to the engine through the pipes 16—16 which connect at bosses 16′ 16′, as clearly appears in Fig. 5.

Within the valve-chamber 20 is a piston-valve 21 controlled by a rod 22 which extends through a stuffing-box 20′ on the end thereof. The valve chamber 20 has a central annular chamber 25 and annular chambers or ports 26 and 27 toward each end. Three-way valves or cocks 23 and 24 are provided at each side for controlling the connection of the chambers 26 and 27 to the supply-pipes 16—16, leading to the engines, so that either chamber 26 may be connected to either pipe or either pipe may be shut off, as the operation of the engine or engines may require. The valves or three-way cocks 23 and 24 are provided with handles 23′ 24′ respectively, which are bent at proper angles to indicate the position of the three-way cocks which control the discharge of steam from the synchronizing valve.

The piston-valve 21 is provided with sections 28, 29 and 30, for controlling the chambers or ports 26 and 27, there being a series of perforations 28′, 29′ and 30′, respectively, in each of the sections, to permit of the discharge of a restricted or limited amount of steam when the said ports 26 and 27 are closed by the said sections. This restriction of the steam is the means adapted for effectively controlling the engines and insuring that they move in step; and, if they start out of step, that they will vary their movement until they come into step. The sections 28, 29 and 30 are so spaced that the full ports may be uncovered and opened.

In certain instances where the duty required of the pump is not definitely known at the time of manufacture, it may be desirable to provide means for controlling and regulating the size of the apertures 28′ 29′ and 30′. This is done by providing a regulating means consisting of adjustable segments (see Fig. 6) 31 within the piston-valve, which have perforations 31′ corresponding to the apertures 28′ 29′ and 30′ in sections 28, 29 and 30. These segments 31 are carried on a rod 32 which extends through a stuffing-box 32′ on the opposite end of the valve-casing from the stuffing-box 20′, and a clamping-rod 33 extends longitudinally through this rod 32 into the end of the valve 21, and a nut 34 is provided to clamp this rod when the same has been rotated or adjusted to control the size of the said apertures. This device for regulating the size of the apertures ordinarily will not be needed, but it is shown as a means for accomplishing such regulation for the said synchronizing-valve for different steam pressures and different duties.

The rod 22 of the synchronizing-valve 21 is connected to the lever-bar 10 at its central position, and the actuation of the lever-bar 10 is what controls the movement of the synchronizing-valve. This bar is actuated by the steam controlling the engine-valve on each engine, the pistons of which serve the double purpose of controlling the valve of each pump and, through their connection by piston-rods 9, actuating the synchronizing-valve.

Having thus enumerated and described the various parts constituting my invention, I will now point out their operation and their consequent purpose.

The first position of the mechanism is indicated in Fig. 7, showing the piston in engine 1 on the point of reversing and the piston of engine 2 at its central position, moving toward the right,—that being the position in which these engines appear in Fig. 1 of the drawing. In this position the steam is passing through the hollow piston-valve 21 out through the restricted perforations 28′ into the chamber 27 and thence through the pipe 16 to engine 1 where the valve is set for the steam to pass to the left-hand end of the cylinder. At the same time, steam is passing freely from the chamber 25 through the wide open ports 29′ to the chamber or port 26 through the pipe 16, without any obstruction, to the left-hand end of engine 2, which should be at about the center of its stroke. The pistons of both engines are thus moved in the same direction and, when the piston of engine 2 reaches the end of its stroke (see Fig. 8), it will through its connections actuate its auxiliary valve, 11 which will operate the steam-actuated engine-valve 6 of that engine, causing it to move to the reversing position, as shown in Fig. 8. When the valve of engine 2 moves to the reversing position, it, of course, through its connection, actuates bar 10 which fulcrums on its pivot on the piston-rod 9 of the valve of engine 1, which moves the synchronizing-valve to the position indicated in Fig. 8 where the section 30 will cover the port 26 and steam will pass thereto only through the restricted apertures 30′. The result is that the piston 3 of the engine 2 begins to move slowly toward the left. The same movement of the valve moves the section 28 from over the port 27 and admits the steam full head without restriction to chamber 27 which permits the steam to act upon the piston 3 of the engine 1 with full force until it reaches the end of its stroke, as indicated in Fig. 9, when the piston 3 of the engine 2 will be at about midstroke. When the piston of engine 1 reaches the end of its stroke, it actuates its auxiliary valve and by it the main valve of the engine 1 is operated and moved instantly to the left to the position appearing in Fig. 9. The bar 10 then acts as a lever to throw the piston-valve 21 a step farther toward the left when the section 29 covers the port 27 and steam is admitted gradually through the apertures 29' to the right hand of the end of the cylinder of engine 1; and the same movement carries the section 30 from over the port 26 and admits the steam full head into the right-hand end of the cylinder 2. The movement then continues until the piston 3 of engine 2 reaches the end of its stroke toward the left, at which time the pistons of engine 1 will be about mid-stroke. When the piston 3 of engine 2 reaches the end of its stroke, it actuates its auxiliary valve, which controls the steam-actuated engine-valve which is thrown toward the right to the position indicated in Fig. 10. This, through the bar 10, actuates the synchronizing-valve, carrying it to the position indicated in Fig. 10; whereupon, the port 27 is again opened and the port 26 is covered by the section 30 and the flow of the steam thereto is restricted through the perforations 30' to the lefthand end of the cylinder of engine 2, and the port 27 is opened and the steam admitted full head to the right hand of the cylinder of engine 1, when its piston 3 will be moved promptly to the left-hand end of its stroke. In engine 2 the piston 3 will be moved to the middle of its stroke toward the right hand end, which brings the said pistons and valves to the position indicated in Fig. 7, when the cycle of movements would be complete. It will be seen from this that there can be no short stroke of either engine, because each controls its own valves, and any tendency for the engines to get out of step will result in retarding the movement of the engine which tends to move most rapidly, by restricting the flow of steam thereto and controlling the same in that way until the opposite engine finishes its stroke, the finish of the stroke in each instance being on a full head of steam and the supply of steam to the opposite engine being restricted until the full stroke of the other engine is completed in each instance,—which restriction, if there is a tendency for one engine to move in advance of the other and get out of step, is continued for more than half of the stroke, thereby compelling the piston thereof, due to the restricted passage, to move slowly while the other piston receives the full head of steam and promptly finishes its stroke. This is an improvement over the usual duplex arrangement of valves, where the pistons of one engine control the valves of the opposite engine, because, under such circumstances, the valves on one engine may be reversed by the opposite engine reaching the end of its stroke, causing one engine to short-stroke, thereby resulting in a great waste of steam and consequent loss, depending upon the extent of the defect in adjustment of the pump. This theoretically results in some loss at any point of the operation of such duplex pumps, because, theoretically, a perfect adjustment would be impossible and the loss would be in proportion to the defects of adjustment. Such pumps require constant attention to keep them in full stroke,—all of which is avoided by my improvements.

When it is desired to cut out either pump for any purpose, with my improved mechanism, one of the three-way cocks 23 or 24 is turned by its handle so that it shuts off the supply pipe 16 to the pump that is to be cut out, and the valve connects the chambers or ports 26 and 27; whereupon, the position of the synchronizing-valve is immaterial because it has no control of the supply of steam. It is best to effect this connection in cutting in this way, as it avoids a multiplicity of valves.

It will be noted that in the operation of this device the two engines are about half-stroke apart, the piston in engine 2 being in the lead about one-half stroke. This position could be reversed by reversing the position of the valves 23 and 24 when the piston of engine 1 would be about half-stroke in the lead of the piston of engine 2. It does not matter, however, which piston is in the lead; the results from the operation of the synchronizing-valve are just the same. If the pistons of the engines are not in this position on starting they will quickly assume this position and relation from the control of my improved synchronizing-valve.

I have described my engine in the form preferred by me to control a pair of engines. The details of construction could unquestionably be greatly varied without departing from my invention. I believe that I have illustrated the same in the best form.

Having thus described my invention, what I claim as new and desire to secure by Letters Patent is:

1. A pair of engines 1 and 2 each provided with a steam-actuated engine-valve consisting of a steam-chest 5 with cylindrical ends, pistons 7—7 in the ends, and a D-slide valve 6 connecting by a stem 8 to the said piston-heads, a piston-rod 9 extending through a suitable stuffing-box 9' at the end of said steam-chest; an auxiliary valve 11 in a steam-chest 12 for controlling the supply of steam to the steam-actuated engine-valve; a valve stem 11' arranged to be actuated by a moving part of the engine, whereby each engine controls its own valve; a synchronizing-valve consisting of a casing 20 with a central port or chamber 25 and end-ports 26 and 27, with a supply leading thereto, and supply-pipes 16 16 leading therefrom to the steam-chests of the two engines, three-way cocks 23 and 24 for controlling the connections of the chambers 26 and 27 to the pipes 16 16, a piston-valve 21 within the valve-casing 20, consisting of sections 28, 29 and 30, containing restricted ports 28′ 29′ and 30′ respectively, for controlling the ports 26 and 27, a valve-stem 22 through a stuffing-box 20′ on the end of the valve-casing 20, means for adjusting the size of the restricted ports 28′ 29′ and 30′, consisting of a stem 32 with perforated plates 31 31 adjustable within the sections of the said piston-valve, the said stem 32 extending through a stuffing-box 32′, and a clamping-bolt 33 with a nut 34 on the end thereof; and a controlling lever-bar 10 connected to the piston rods 9 of the steam-actuated engine-valve and to the valve-stem 22 of the synchronizing-valve, for the purpose of controlling the said synchronizing-valve, all co-acting substantially as described and for the purpose specified.

2. The combination of a pair of engines 1 and 2 each provided with a steam-actuated engine-valve consisting of a steam-chest 5 with cylindrical ends, pistons 7—7 in the ends, and a D-slide valve 6 connecting by a stem 8 to the said piston-heads, a piston-rod 9 extending through a suitable stuffing-box 9′ at the end of said steam-chest; an auxiliary valve 11 in a steam chest 12 for controlling the supply of steam to the steam-actuated engine-valve; a valve-stem 11′ arranged to be actuated by a moving part of the engine, whereby each engine controls its own valve; a synchronizing-valve consisting of a casing 20 with a central port or chamber 25 and end-ports 26 and 27, with a supply leading thereto, and supply-pipes 16 16 leading therefrom to the steam-chests of the two engines, a piston-valve 21 within the valve-casing 20, consisting of sections 28, 29 and 30, containing restricted ports 28′ 29′ and 30′ respectively, for controlling the ports 26 and 27, a valve stem 22 through a stuffing-box 20′ on the end of the valve-casing 20, and means for adjusting the size of the restricted ports 28′ 29′ and 30′, consisting of a stem 32 with perforated plates 31 31 adjustable within the sections of said piston-valve, the said stem 32 extending through a stuffing-box 32′, and a clamping-bolt 33 with a nut 34 on the end thereof; and a controlling lever-bar 10 connected to the piston rods 9 of the steam-actuated engine-valve and to the valve-stem 22 of the synchronizing-valve, for the purpose of controlling the said synchronizing-valve, all coacting substantially as described and for the purpose specified.

3. The combination of a pair of engines 1 and 2 each provided with a steam-actuated engine-valve consisting of a steam-chest 5 with cylindrical ends, pistons 7—7 in the ends, and a D-slide valve 6 connecting by a stem 8 to the said piston-heads, and a piston-rod 9 extending through a suitable stuffing-box 9′ at the end of said steam-chest; an auxiliary valve 11 in a steam-chest 12 for controlling the supply of steam to the steam-actuated engine-valve; a valve stem 11′ arranged to be actuated by a moving part of the engine, whereby each engine controls its own valve; a synchronizing-valve consisting of a casing 20 with a central port or chamber 25 and end-ports 26 and 27, with a supply leading thereto, supply-pipes 16 16 leading therefrom to the steam-chests of the two engines, three-way cocks 23 and 24 for controlling the connections of the chambers 26 and 27 to the pipes 16 16, a piston-valve 21 within the valve-casing 20, consisting of sections 28, 29 and 30, containing restricted ports 28′ 29′ and 30′ respectively, for controlling the ports 26 and 27, a valve-stem 22 through a stuffing-box 20′ on the end of the valve-casing 20, and means for adjusting the size of the restricted ports 28′ 29′ and 30′, consisting of a stem 32 with perforated plates 31 31 adjustable within the sections of the said piston-valve, the said stem 32 extending through a stuffing-box 32′, and a clamping-bolt 33 with a nut 34 on the end thereof; and a controlling lever-bar connected to said steam-actuated engine-valve and to the valve stem 22 of the synchronizing-valve, for the purpose of controlling the said synchronizing-valve, all co-acting substantially as described and for the purpose specified.

4. The combination of a pair of engines 1 and 2 each provided with a steam-actuated engine-valve consisting of a steam-chest 5 with cylindrical ends, pistons 7—7 in the ends, and a D-slide valve 6 connecting by a stem 8 to the said piston-heads, and a piston-rod 9 extending through a suitable stuffing-box 9′ at the end of said steam-chest; an auxiliary valve 11 in a steam-chest 12 for controlling the supply of steam to the steam-actuated engine-valve; a valve-stem 11′ arranged to be actuated by a moving part of the engine, whereby each engine controls its own valve; a synchronizing-valve consisting of a casing 20 with a central port or chamber 25 and end-ports 26 and 27, with a supply leading thereto, supply-pipes 16 16 leading therefrom to the steam-chests of the two engines, a piston-valve 21 within the valve-casing 20, consisting of sections 28 29 and 30, containing restricted ports 28′ 29′ and 30′ respectively, for controlling the ports 26 and 27, a valve stem 22 through a stuffing-box 20′ on the end of the valve-casing 20, and means for adjusting the size of the restricted ports 28′ 29′ and 30′, consisting of a stem 32 with perforated plates 31 31 adjustable within the sections of the said piston-valve, the said stem 32 extending through a stuffing-box 32', and a clamping-bolt 33 with a nut 34 on the end thereof; and a controlling lever-bar connected to said steam-actuated engine-valve and to the valve-stem 22 of the synchronizing-valve, for the purpose of controlling the said synchronizing-valve, all co-acting substantially as described and for the purpose specified.

5. The combination of a pair of engines 1 and 2 each provided with a steam-actuated engine-valve consisting of a steam-chest 3 with cylindrical ends, pistons 7—7 in the ends, a D-slide valve 6 connecting by a stem 8 to the said piston-heads, and a piston-rod 9 extending through a suitable stuffing-box 9' at the end of said steam-chest; an auxiliary valve 11 in a steam-chest 12 for controlling the supply of steam to the steam-actuated engine-valve; a valve-stem 11' arranged to be actuated by a moving part of the engine, whereby each engine controls its own valve; a synchronizing-valve consisting of a casing 20 with a central port or chamber 25 and end-ports 26 and 27, with a supply leading thereto, supply-pipes 16 16 leading therefrom to the steam-chests of the two engines, three-way cocks 23 and 24 for controlling the connections of the chambers 26 and 27 to the pipes 16 16, a piston-valve 21 within the valve-casing 20, consisting of sections 28, 29 and 30, containing restricted ports 28' 29' and 30' respectively, for controlling the ports 26 and 27, a valve-stem 22 through a stuffing-box 20' on the end of the valve-casing 20, and means for adjusting the size of the restricted ports 28' 29' and 30', consisting of a stem 32 with perforated plates 31 31 adjustable within the sections of the said piston-valve, the said stem 32 extending through a stuffing-box 32', and a clamping-bolt 33 with a nut 34 on the end thereof; and connections from the said engine-valve to the said synchronizing-valve, for controlling the same, all co-acting substantially as described and for the purpose specified.

6. The combination of a pair of engines 1 and 2 each provided with a steam-actuated engine-valve consisting of a steam-chest 5 with cylindrical ends, pistons 7—7 in the ends, a D-slide-valve 6 connected by a stem 8 to the said piston-heads, and a piston-rod 9 extending through a suitable stuffing-box 9' at the end of said steam-chest; an auxiliary valve 11 in a steam-chest 12 for controlling the supply of steam to the steam-actuated engine-valve; a valve-stem 11' arranged to be actuated by a moving part of the engine, whereby each engine controls its own valve; a synchronizing-valve consisting of a casing 20 with a central port or chamber 25 and end-ports 26 and 27 with a supply leading thereto and supply-pipes 16 16 leading therefrom to the steam-chests of the two engines, a piston-valve 21 within the valve-casing 20, consisting of sections 28 29 and 30, containing restricted ports 28' 29' and 30' respectively, for controlling the ports 26 and 27, a valve-stem 22 through a stuffing-box 20' on the end of the valve-casing 20, and means for adjusting the size of the restricted ports 28' 29' and 30' consisting of a stem 32 with perforated plates 31 31 adjustable within the sections of the said piston-valve, the said stem 32 extending through a stuffing-box 32', and a clamping-bolt 33 with a nut 34 on the end thereof; and connections from the said engine-valve to the said synchronizing-valve, for controlling the same, all co-acting substantially as described and for the purpose specified.

7. The combination of a pair of engines 1 and 2 each provided with a steam-actuated engine-valve consisting of a steam-chest 5 with cylindrical ends, pistons 7—7 in the ends, a D-slide valve 6 connecting by a stem 8 to the said piston-heads, and a piston-rod 9 extending through a suitable stuffing-box 9' at the end of said steam-chest; an auxiliary valve 11 in a steam-chest 12 for controlling the supply of steam to the steam-actuated engine-valve; a valve-stem 11' arranged to be actuated by a moving part of the engine, whereby each engine controls its own valve; a synchronizing-valve consisting of a casing 20 with a central port or chamber 25 and end-ports 26 and 27, with a supply leading thereto and supply pipes 16 16 leading therefrom to the steam-chests of the two engines, three-way cocks 23 and 24 for controlling the connections of the chambers 26 and 27 to the pipes 16 16, a piston-valve 21 within the valve-casing 20, consisting of sections 28 29 and 30, containing restricted ports 28' 29' and 30' respectively, for controlling the ports 26 and 27, and a valve-stem 22 through a stuffing-box 20' on the end of the valve-casing 20; and a controlling lever-bar 10 connected to the piston-rods 9 of the steam-actuated engine-valve and to the valve-stem 22 of the synchronizing-valve, for the purpose of controlling the said synchronizing-valve, all co-acting substantially as described and for the purpose specified.

8. The combination of a pair of engines 1 and 2 each provided with a steam-actuated engine-valve consisting of a steam-chest 5 with cylindrical ends, pistons 7—7 in the ends, a D-slide valve 6 connecting by a stem 8 to the said piston-heads, and a piston-rod 9 extending through a suitable stuffing-box 9' at the end of said steam-chest; an auxiliary valve 11 in a steam-chest 12 for controlling the supply of steam to the steam-actuated engine-valve; a valve-stem 11' arranged to be actuated by a moving part of the engine, whereby each engine controls its own valve; a synchronizing-valve consisting of a casing 20 with a central port or chamber 25 and end-ports 26 and 27 with a supply leading thereto and supply pipes 16 16 leading therefrom to the steam-chests of the two engines, a piston-valve 21 within the valve-casing 20, consisting of sections 28, 29 and 30, containing restricted ports 28' 29' and 30' respectively, for controlling the ports 26 and 27, and a valve-stem 22 through a stuffing-box 20' on the end of the valve-casing 20; and a controlling lever-bar 10 connected to the piston-rods 9 of the steam-actuated engine-valve and to the valve-stem 22 of the synchronizing-valve, for the purpose of controlling the said synchronizing-valve, all co-acting substantially as described and for the purpose specified.

9. The combination of a pair of engines 1 and 2 each provided with a steam-actuated engine-valve consisting of a steam-chest 5 with cylindrical ends, pistons 7—7 in the ends, a D-slide valve 6 connecting by a stem 8 to the said piston-heads, and a piston-rod 9 extending through a suitable stuffing-box 9' at the end of said steam-chest; an auxiliary valve 11 in a steam-chest 12 for controlling the supply of steam to the steam-actuated engine-valve; a valve-stem 11' arranged to be actuated by a moving part of the engine, whereby each engine controls its own valve; a synchronizing-valve consisting of a casing with a central port or chamber 25 and end-ports 26 and 27, with a supply leading thereto, and supply-pipes 16 16 leading therefrom to the steam-chests of the two engines, three-way cocks 23 and 24 for controlling the connections of the chambers 26 and 27 to the pipes 16 16, a piston-valve 21 within the valve-casing 20, consisting of sections 28, 29 and 30, containing restricted ports 28' 29' and 30' respectively, for controlling the ports 26 and 27, and a valve-stem 22 through a stuffig-box 20' on the end of the valve-casing 20; and a controlling-lever bar connected to said steam-actuated engine-valve and to the valve-stem 22 of the synchronizing-valve, for the purpose of controlling the said synchronizing-valve, all co-acting substantially as described and for the purpose specified.

10. The combination of a pair of engines 1 and 2 each provided with a steam-actuated engine-valve consisting of a steam-chest 5 with cylindrical ends, pistons 7—7 in the ends, a D-slide-valve 6 connecting by a stem 8 to the said piston-heads, and a piston-rod 9 extending through a suitable stuffing-box 9' at the end of said steam-chest; an auxiliary valve 11 in a steam-chest 12 for controlling the supply of steam to the steam-actuated engine-valve; a valve-stem 11' arranged to be actuated by a moving part of the engine, whereby each engine controls its own valve; a synchronizing-valve consisting of a casing 20 with a central port or chamber 25 and end-ports 26 and 27, with a supply leading thereto, and supply-pipes 16 16 leading therefrom to the steam-chests of the two engines, a piston-valve 21 within the valve-casing 20, consisting of sections 28, 29 and 30, containing restricted ports 28' 29' and 30' respectively, for controlling the ports 26 and 27, and a valve-stem 22 through a stuffing-box 20' on the end of the valve-casing 20; and a controlling lever-bar connected to said steam-actuated engine-valve and to the valve-stem 22 of the synchronizing-valve, for the purpose of controlling the said synchronizing-valve, all co-acting substantially as described and for the purpose specified.

11. The combination of a pair of engines 1 and 2, each provided with a steam-actuated engine-valve consisting of a steam-chest 5 with cylindrical ends, pistons 7—7 in the ends, a D-slide valve 6 connecting by a stem 8 to the said piston-heads, and a piston-rod 9 extending through a suitable stuffing-box 9' at the end of said steam-chest; an auxiliary valve 11 in a steam-chest 12 for controlling the supply of steam to the steam-actuated engine-valve; a valve-stem 11' arranged to be actuated by a moving part of the engine, whereby each engine controls its own valve; a synchronizing-valve consisting of a casing 20 with a central port or chamber 25 and end-ports 26 and 27, with a supply leading thereto and supply-pipes 16 16 leading therefrom to the steam-chests of the two engines, three-way cocks 23 and 24 for controlling the connections of the chambers 26, 27, to the pipes 16 16, a piston-valve 21 within the valve-casing 20, consisting of sections 28, 29 and 30, containing restricted ports 28' 29' and 30' respectively, for controlling the ports 26 and 27, and a valve-stem 22 through a stuffing-box 20' on the end of the valve-casing 20; and connections from the said engine-valve to the said synchronizing-valve, for controlling the same, all co-acting substantially as described and for the purpose specified.

12. The combination of a pair of engines 1 and 2 each provided with a steam-actuated engine-valve consisting of a steam-chest 5 with cylindrical ends, pistons 7—7 in the ends, a D-slide valve 6 connecting by a stem 8 to the said piston-heads, and a piston-rod extending through a suitable stuffing-box 9' at the end of said steam-chest; an auxiliary valve 11 in a steam-chest 12 for controlling the supply of steam to the steam-actuated engine-valve; a valve-stem 11' arranged to be actuated by a moving part of the engine, whereby each engine controls its own valve; a synchronizing-valve consisting of a casing 20 with a central port or chamber 25 and end-ports 26 and 27, with a supply leading thereto, and supply pipes 16 16 leading therefrom to the steam-chests of the two engines, a piston-valve 21 within the valve-casing 20, consisting of sections 28, 29 and 30, containing restricted ports 28' 29' and 30' respectively, for controlling the ports 26 and 27, and a valve-stem 22 through a stuffing box 20' on the end of the valve-casing 20; and connections from the said engine valve to the said synchronizing-valve, for controlling the same, all co-acting substantially as described and for the purpose specified.

13. The combination of a pair of engines 1 and 2 each provided with a steam-actuated engine-valve consisting of a steam-chest 5 with cylindrical ends, pistons 7—7 in the ends, a D-slide valve 6 connecting by a stem 8 to the said piston-heads, and a piston-rod 9 extending through a suitable stuffing-box 9' at the end of said steam-chest; an auxiliary valve 11 in a steam-chest 12 for controlling the supply of steam to the steam-actuated engine-valve; a valve-stem 11' arranged to be actuated by a moving part of the engine, whereby each engine controls its own valve, a synchronizing-valve consisting of a casing 20 with a central port or chamber 25 and end-ports 26 and 27, with a supply leading thereto, and supply pipes 16 16 leading therefrom to the steam-chests of the two engines, three-way cocks 23 and 24 for controlling the connections of the chambers 26, 26, to the pipes 16 16, a piston-valve 21 within the valve-casing 20, consisting of sections 28, 29 and 30, containing restricted ports 28' 29' and 30' respectively, for controlling the ports 26 and 27, a valve-stem 22 through a stuffing-box 20' on the end of the valve-casing 20, means for adjusting the size of the restricted ports 28' 29' and 30', consisting of a stem 32 with perforated plates 31 31 adjustable within the sections of the said piston-valve, the said stem 32 extending through a stuffing-box 32', and a clamping-bolt 33 with a nut 34 on the end thereof; and connections to the piston-rods of said steam-actuated engine-valves, for the purpose of controlling the said synchronizing-valve, all co-acting for the purpose specified.

14. The combination of a pair of engines 1 and 2 each provided with a steam-actuated engine-valve consisting of a steam-chest 5 with cylindrical ends, pistons 7—7 in the ends, a D-slide valve 6 connecting by a stem 8 to the said piston-heads, and a piston-rod 9 extending through a suitable stuffing-box 9' at the end of said steam-chest; an auxiliary valve 11 in a steam-chest 12 for controlling the supply of steam to the steam-actuated engine-valve; a valve-stem 11' arranged to be actuated by a moving part of the engine, whereby each engine controls its own valve; a synchronizing-valve consisting of a casing 20 with a central port or chamber 25 and end-ports 26 and 27, with a supply leading thereto, and supply-pipes 16 16 leading therefrom to the steam-chests of the two engines, a piston-valve 21 within the valve-casing 20, consisting of sections 28, 29 and 30, containing restricted ports 28' 29' and 30' respectively, for controlling the ports 26 and 27, a valve stem 22 through a stuffing-box 20' on the end of the valve-casing 20, and means for adjusting the size of the restricted ports 28' 29' and 30', consisting of a stem 32 with perforated plates 31 31 adjustable within the sections of the said piston-valve, the said stem 32 extending through a stuffing-box 32', and a clamping-bolt 33 with a nut 34 on the end thereof; and connections to the piston-rods of said steam-actuated engine-valves, for the purpose of controlling said synchronizing-valve, all co-acting for the purpose specified.

15. The combination of a pair of engines 1 and 2 each provided with a steam-actuated engine-valve consisting of a steam-chest 5 with cylindrical ends, pistons 7—7 in the ends, a D-slide valve 6 connecting by a stem 8 to the said piston-heads, and a piston-rod 9 extending through a suitable stuffing-box 9' at the end of said steam-chest; an auxiliary valve 11 in a steam-chest 12 for controlling the supply of steam to the steam-actuated engine-valve; a valve-stem 11' arranged to be actuated by a moving part of the engine, whereby each engine controls its own valve; a synchronizing-valve consisting of a casing 20 with a central port or chamber 25 and end-ports 26 and 27, with a supply leading thereto, and supply-pipes 16 16 leading therefrom to the steam-chests of the two engines, three-way cocks 23 and 24 for controlling the connections of the chambers 26, 27, to the pipes 16 16, a piston-valve 21 within the valve-casing 20, consisting of sections 28, 29 and 30, containing restricted ports 28' 29' and 30' respectively, for controlling the ports 26 and 27, and a valve stem 22 through a stuffing-box 20' on the end of the valve-casing 20; and connections to the piston-rods of said steam-actuated engine-valves, for the purpose of controlling said synchronizing-valve, for the purpose specified.

16. The combination of a pair of engines 1 and 2 each provided with a steam-actuated engine-valve consisting of a steam-chest 5 with cylindrical ends, pistons 7—7 in the ends, a D-slide valve 6 connecting by a stem 8 to the said piston-heads, and a piston-rod 9 extending through a suitable stuffing-box 9' at the end of said steam-chest; an auxiliary valve 11 in a steam-chest 12 for controlling the supply of steam to the steam-actuated engine-valve; a valve-stem 11' arranged to be actuated by a moving part of the engine, whereby each engine controls its own valve; a synchronizing-valve consisting of a casing 20 with a central port or chamber 25 and end-ports 26 and 27, with a supply leading thereto, and supply-pipes 16 16 leading therefrom to the steam-chests of the two engines, a piston-valve 21 within the valve-casing 20, consisting of sections 28, 29, and 30, containing restricted ports 28', 29' and 30', respectively, for controlling the ports 26 and 27, a valve-stem 22 through a stuffing-box 20' on the end of the valve-casing 20; and connections to the piston-rods of said steam-actuated engine-valves, for the purpose of controlling the said synchronizing-valve, for the purpose specified.

17. The combination of a pair of direct acting steam engines, each containing a steam-actuated valve and an auxiliary valve controlled from the piston of each of said engines for controlling the said steam-actuated valve thereof whereby each engine controls its own valve; a synchronizing-valve arranged between the said engines; a lever-bar with suitable connections to both of the said steam-actuated valves; connections from the said bar to the synchronizing-valve; restricting passages in said synchronizing-valve controlling the ports of said valve to restrict the initial flow of steam to the said engines; a supply-pipe to the synchronizing-valve; supply-pipes from the synchronizing-valve to the steam-chests of the engines, whereby the actuation of the steam-actuated valve controls and regulates the supply of steam to the said steam-chests of said engines, substantially as described and for the purpose specified.

18. The combination of a plurality of steam engines; steam-actuated engine-valves for each of said engines; an auxiliary valve controlled by a moving part of each engine for admitting steam to actuate the steam-actuated engine-valve thereof whereby each engine controls its own valve; a synchronizing-valve having restricted and also full ports for controlling the flow of steam to the engine valves of each engine; and mechanical connections to the steam-actuated engine-valves of each engine for controlling the flow of steam to first restrict the initial flow and open the full port of each engine by the steam-actuated engine-valve of the other, as specified.

19. The combination of a plurality of steam engines; steam-actuated engine-valves for each of said engines; an auxiliary valve controlled by a moving part of each engine, for admitting steam to actuate the steam-actuated engine-valve thereof whereby each engine controls its own valve; a synchronizing-valve for controlling the flow of steam to the engine-valve of each engine; and mechanical connections to the steam-actuated engine valves of each engine for controlling the flow of steam to each engine by the steam-actuated engine-valve of the other, as specified.

20. The combination of a plurality of steam engines; steam actuated engine valves for each of said engines; a synchronizing valve arranged in the supply passage to said engines with ports for controlling the delivery of steam to said engine valves; and mechanical connections to moving parts of the engines for operating said synchronizing valve to throttle the engine which tends to outrun the other, coacting for the purpose specified.

21. The combination of a plurality of steam engines, steam actuated valves for each of said engines, a synchronizing valve arranged in the supply passage to said engines with ports for controlling the delivery of steam to said engine valves, and operating mechanical connections for each engine to said synchronizing valve arranged so that the valve is actuated to throttle the engine which tends to outrun the other, coacting for the purpose specified.

22. The combination of a plurality of steam engines, steam actuated valves for each of said engines, a synchronizing valve to control the operation of said engines, a mechanical connection from the said synchronizing valve to the steam actuated engine valves whereby the said synchronizing valve is controlled by the said engine valves, for the purpose specified.

In witness whereof, I have hereunto set my hand and seal in the presence of two witnesses.

JOHN C. BIRD. [L. S.]

Witnesses:
C. W. BRAINARD,
EDWARD REEVES.